United States Patent [19]
Henricot

[11] 3,946,677
[45] Mar. 30, 1976

[54] SUSPENSION DEVICES OF SIDE MEMBERS ON AXLE-BOXES FOR RAILWAY CARRIAGES AND SIMILAR APPLICATIONS

[75] Inventor: Paul E. Henricot, Ceroux-Mousty, Belgium

[73] Assignee: Societe Anonyme Usines Emile Henricot, Court-Saint-Etienne, Belgium

[22] Filed: Nov. 5, 1974

[21] Appl. No.: 521,077

[30] Foreign Application Priority Data
Jan. 10, 1974 Belgium .............................. 809588

[52] U.S. Cl. ............................................ 105/224.1
[51] Int. Cl.² ............................................ B61F 5/26
[58] Field of Search......... 105/224.1, 224 R, 221 R, 105/222, 223

[56] References Cited
UNITED STATES PATENTS

| | | | |
|---|---|---|---|
| 1,825,530 | 9/1931 | Latshaw | 105/224.1 |
| 2,952,224 | 9/1960 | Bachman | 105/224.1 X |
| 3,006,290 | 10/1961 | Seelig, Jr. | 105/224.1 X |
| 3,276,395 | 10/1966 | Heintzel | 105/224.1 |
| 3,682,104 | 8/1972 | Henricot | 105/224.1 |
| 3,785,298 | 1/1974 | Reynolds | 105/224.1 X |

*Primary Examiner*—John J. Love
*Attorney, Agent, or Firm*—Bacon & Thomas

[57] ABSTRACT

The invention pertains to improved suspension devices for railway carriage axle-boxes, wherein elastic ring portions are inserted between the side members and the axle-boxes.

1 Claim, 4 Drawing Figures

SUSPENSION DEVICES OF SIDE MEMBERS ON AXLE-BOXES FOR RAILWAY CARRIAGES AND SIMILAR APPLICATIONS

It is a well known practice to provide an elastic connection between the bogie side members and the axle boxes by means of rubber rings fitted between side members and boxes, such rubber rings being inserted between a circular ridge provided on the ends of the side members, on the one hand, and ledges which are provided at the front and at the rear of the axle-boxes, on the other hand.

The purpose of the invention is considerably to simplify the fitting of the side members on the boxes. In view hereof, the improvements according to the invention consist in replacing the complete circular rubber rings of the prior practice by ring portions. This simplification is made possible by the fact that in the known devices the lower part of the rings carry no vertical load, so that it may simply be omitted. These ring portions are inserted between a semicircular ridge of the side member and ledges which are integral with the box or with an adaptor. The result of this new connection is just as efficient as that of the complete rings, as has been proved in practice. Moreover, the inner diameter of these ring portions may be excentric with respect to the outer diameter, in order to obtain the same effect as that produced by the excentricity already recommended for the complete rings.

The fitting of the side members on the boxes is simplified due to the fact that, before assembly, the ring portions and the adaptors are maintained in their correct position in the seats of the side member by means of appropriate stops fixed to the side member. The actual fitting is thus simply carried out by depositing the side members on the boxes without any particular attention to the adjustment of the ring portions.

It is advisable to make use of some appropriate means of attachment in order to prevent any undesired lifting of the side member, whilst permitting the lifting of the bogie with its axles. The two elastic ring portions as well as the adjacent elements which assure their positioning and their attachment are essentially variable, they may be replaced by equivalent elements or by elements which perform equivalent functions.

As an example, and without the slightest intent of restriction, a form of embodiment is described hereinafter with reference to the appended drawings in which.

Figure 1:
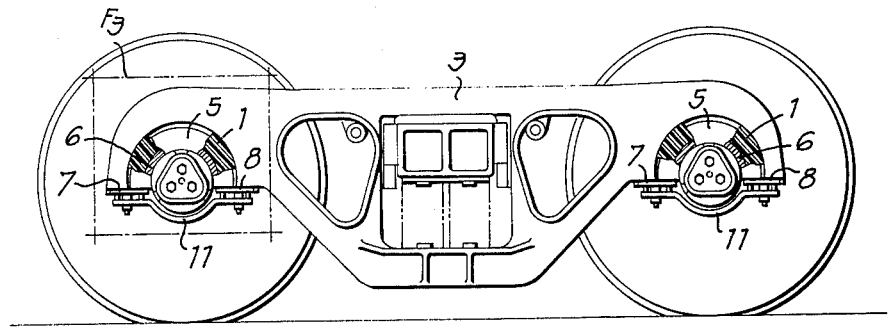
FIG. 1 shows a side view of the essential elements of a bogie which applies the improvements which are the subject of the invention.
Figure 2:
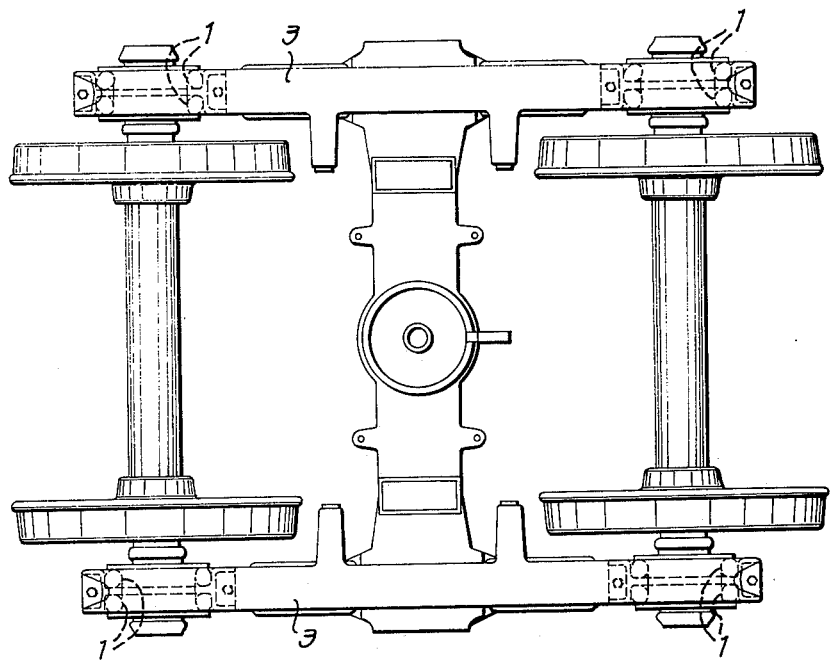
FIG. 2 is a top view thereof.
Figure 3:
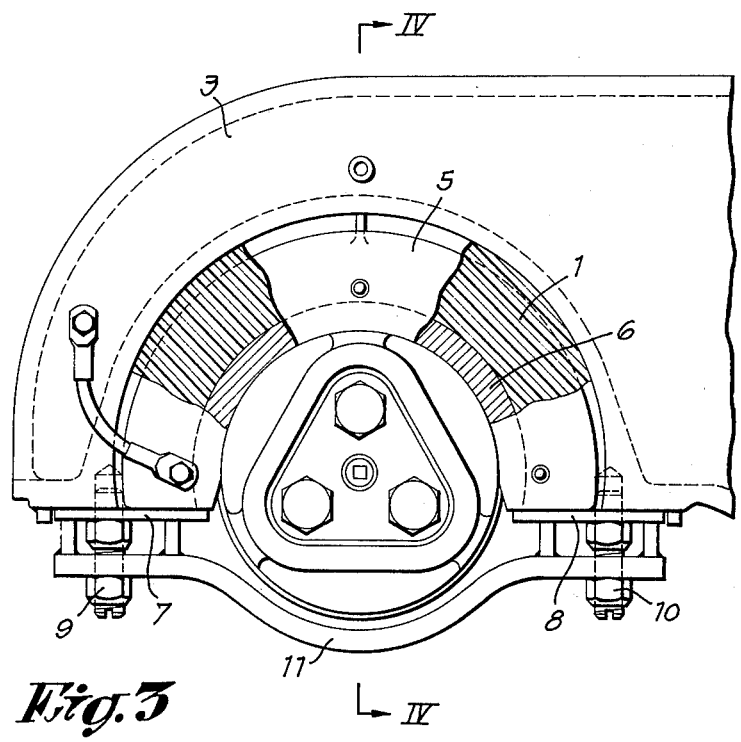
FIG. 3 illustrates, to a larger scale and with partial sections, that part of FIG. 1 which is indicated by F3.
Figure 4:
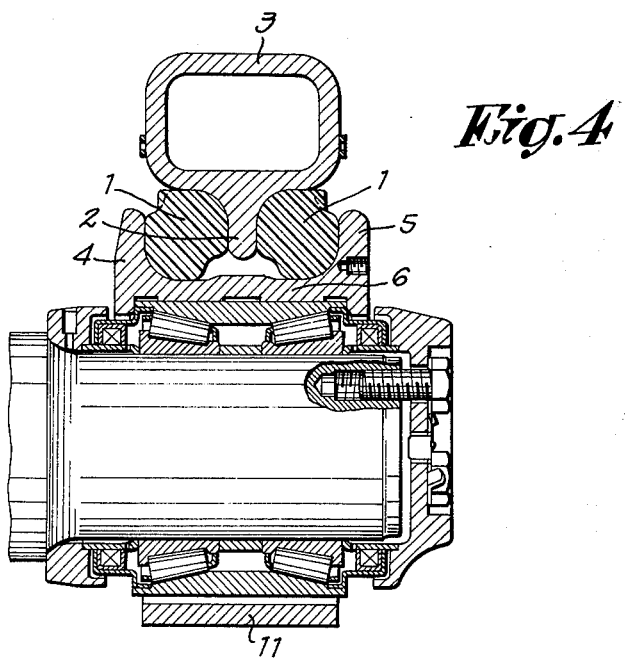
FIG. 4 is a section taken on line IV—IV in FIG. 3.

In the illustrated embodiment, the ring portions, are in the shape of rubber half rings 1, are inserted between a ridge 2 of side members 3 and the ledges 4–5 of an intermediate adapter part 6. Before fitting the side members to the axles, ring portions 1 as well as adaptor 6 are supported by stops 7–8 fixed to the side members 3 by any well known means. At the location of each box, a sub-guard 11 is attached to the side members by means of bolts 9–10, to act as a safety means against accidental lifting of the side member.

The other components of the bogie are all well known and may be essentially variable.

The invention is concerned with the described improvements as well as with the elastic half rings which are conditioned so as to be able to apply aforesaid improvements.

What I claim is:

1. A suspension device for a railway car, comprising:
a generally cylindrical axle box;
a side frame having a semicircular rib over and spaced from said axle box and having a downwardly open semi circular recess on each side of said rib;
a semi cylindrical adapter on said axle box and having spaced rim portions below said recesses and spaced axially from said rib;
a semi circular rubber bead seated in each recess and resting on said adapter inwardly of said corresponding rim portions to resiliently support said side frame on said axle box;
stop members on said side member adjacent the ends of said recesses and engaging adjacent ends of said rubber beads to retain the same in said recesses; and
a guard member extending under said axle box and being secured to said side member to prevent upward separation of said side member and beads from said axle box.

* * * * *